(12) United States Patent
Seigler et al.

(10) Patent No.: US 8,451,555 B2
(45) Date of Patent: *May 28, 2013

(54) RECORDING HEAD FOR HEAT ASSISTED MAGNETIC RECORDING

(75) Inventors: Michael Allen Seigler, Pittsburgh, PA (US); Mark William Covington, Edina, MN (US); Michael Leigh Mallary, Harmony, PA (US); Hua Zhou, Pittsburgh, PA (US); Amit Vasant Itagi, Seven Fields, PA (US)

(73) Assignee: Seagate Technology LLC, Cupertino, CA (US)

( * ) Notice: Subject to any disclaimer, the term of this patent is extended or adjusted under 35 U.S.C. 154(b) by 1094 days.

This patent is subject to a terminal disclaimer.

(21) Appl. No.: 12/391,326

(22) Filed: Feb. 24, 2009

(65) Prior Publication Data

US 2010/0214685 A1    Aug. 26, 2010

(51) Int. Cl.
*G11B 5/09* (2006.01)
*G11B 5/127* (2006.01)

(52) U.S. Cl.
USPC ............... 360/59; 360/125.01; 360/125.3; 360/125.31; 360/125.32; 360/125.03; 360/125.06; 360/125.07; 360/125.08

(58) Field of Classification Search
None
See application file for complete search history.

(56) References Cited

U.S. PATENT DOCUMENTS

| | | | |
|---|---|---|---|
| 7,027,700 B2* | 4/2006 | Challener | 385/129 |
| 7,330,404 B2* | 2/2008 | Peng et al. | 369/13.33 |
| 7,864,434 B2* | 1/2011 | Peng | 359/642 |
| 7,965,464 B2* | 6/2011 | Batra et al. | 360/59 |
| 8,164,855 B1* | 4/2012 | Gibbons et al. | 360/125.74 |
| 8,248,891 B2* | 8/2012 | Lee et al. | 369/13.17 |
| 8,307,540 B1* | 11/2012 | Tran et al. | 29/603.16 |
| 8,320,219 B1* | 11/2012 | Wolf et al. | 369/13.33 |
| 8,320,220 B1* | 11/2012 | Yuan et al. | 369/13.33 |
| 8,339,739 B2* | 12/2012 | Balamane et al. | 360/125.3 |
| 2003/0112542 A1 | 6/2003 | Rettner et al. | |
| 2003/0235121 A1 | 12/2003 | Eppler | |
| 2004/0001394 A1* | 1/2004 | Challener et al. | 369/13.32 |
| 2004/0001420 A1 | 1/2004 | Challener | |
| 2005/0041950 A1 | 2/2005 | Rottmayer et al. | |
| 2005/0052771 A1* | 3/2005 | Rausch et al. | 360/59 |
| 2005/0078565 A1 | 4/2005 | Peng et al. | |
| 2005/0289576 A1* | 12/2005 | Challener | 720/658 |
| 2006/0143635 A1* | 6/2006 | Liu et al. | 720/659 |
| 2008/0170319 A1* | 7/2008 | Seigler et al. | 360/59 |
| 2009/0073858 A1* | 3/2009 | Seigler et al. | 369/112.27 |
| 2010/0123965 A1* | 5/2010 | Lee et al. | 360/59 |
| 2012/0039155 A1* | 2/2012 | Peng et al. | 369/13.14 |

OTHER PUBLICATIONS

U.S. Appl. No. 11/857,498, filed Sep. 19, 2007, Seigler et al.

* cited by examiner

*Primary Examiner* — Kevin Bernatz
(74) *Attorney, Agent, or Firm* — HolzerIPLaw, PC (57) ABSTRACT

An apparatus includes a waveguide having a core layer and an end adjacent to an air bearing surface, first and second poles magnetically coupled to each other and positioned on opposite sides of the waveguide, wherein the first pole includes a first portion spaced from the waveguide and a second portion extending from the first portion toward the air bearing surface, with the second portion being structured such that an end of the second portion is closer to the core layer of the waveguide than the first portion, and a heat sink positioned adjacent to the second portion of the first pole.

20 Claims, 8 Drawing Sheets

RECORDING HEAD FOR HEAT ASSISTED MAGNETIC RECORDING

BACKGROUND

This invention relates to magnetic recording heads, and more particularly to such recording heads for use in heat assisted magnetic recording devices.

In thermally assisted magnetic recording, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region.

One example of a recording head for use in heat assisted magnetic recording generally includes a write pole and a return pole magnetically coupled to each other through a yoke or pedestal, and a waveguide for focusing light onto the storage medium. The waveguide is positioned between the write pole and the return pole. Light is coupled into the waveguide above the yoke and is transmitted through the waveguide on opposite sides of the yoke.

SUMMARY

In a first aspect, the invention provides an apparatus including a waveguide having a core layer and an end adjacent to an air bearing surface, first and second poles magnetically coupled to each other and positioned on opposite sides of the waveguide, wherein the first pole includes a first portion spaced from the waveguide and a second portion extending from the first portion toward the air bearing surface, with the second portion being structured such that an end of the second portion is closer to the core layer of the waveguide than the first portion, and a heat sink positioned adjacent to the second portion of the first pole.

In another aspect, the invention provides an apparatus including a waveguide having a core layer and an end adjacent to an air bearing surface, first and second poles magnetically coupled to each other and positioned on opposite sides of the waveguide, wherein the first pole includes a first portion spaced from the waveguide and a second portion extending from the first portion toward the air bearing surface, with the second portion being structured such that an end of the second portion is closer to the core layer of the waveguide than the first portion, a near-field transducer positioned adjacent to a focal point of the waveguide, and a heat sink positioned between the near-field transducer and the second portion of the first pole.

In another aspect, the invention provides an apparatus including a waveguide having a core layer and an end adjacent to an air bearing surface, first and second poles magnetically coupled to each other and positioned on opposite sides of the waveguide, wherein the first pole includes a first portion spaced from the waveguide and a second portion extending from the first portion toward the air bearing surface, with the second portion being structured such that an end of the second portion is closer to the core layer of the waveguide than the first portion, and wherein the second portion of the first pole includes a first section that is positioned substantially parallel to the core layer.

In another aspect the invention provides an apparatus including a waveguide having a core layer and an end adjacent to an air bearing surface, a main pole positioned adjacent to a first side of the waveguide, and first and second return poles positioned on opposites sides of the main pole and magnetically coupled to the main pole, wherein the main pole and the first and second return poles are positioned adjacent to the first side of the waveguide, wherein the main pole and each of the first and second return poles includes a first portion spaced from the waveguide and a second portion extending from the first portion toward the air bearing surface, with the second portion being structured such that an end of the second portion is closer to the core layer of the waveguide than the first portion.

DETAILED DESCRIPTION OF THE INVENTION

Figure 1:
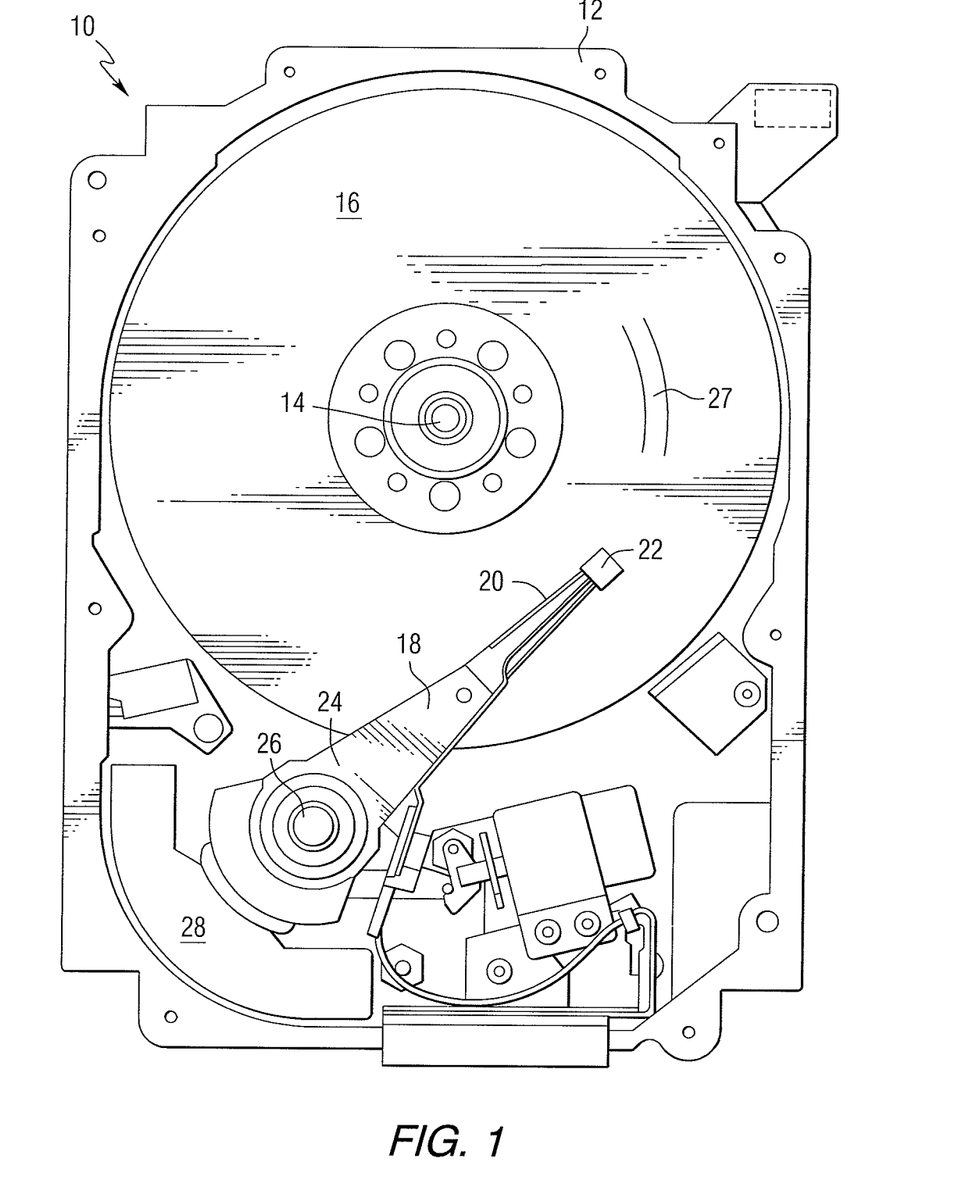
FIG. 1 is a pictorial representation of a data storage device in the form of a disc drive that can include a recording head constructed in accordance with an aspect of this invention.

This invention encompasses various devices used for heat assisted magnetic recording. FIG. 1 is a pictorial representation of a data storage device in the form of a disc drive 10 that can utilize recording heads constructed in accordance with various aspects of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. To launch light into the waveguide, a grating coupler can be used.

While FIG. 1 shows a disc drive, the invention can be applied to other storage devices that include a transducer and a storage media, wherein the storage media is heated to facilitate switching of bits in the storage media.

Figure 2:
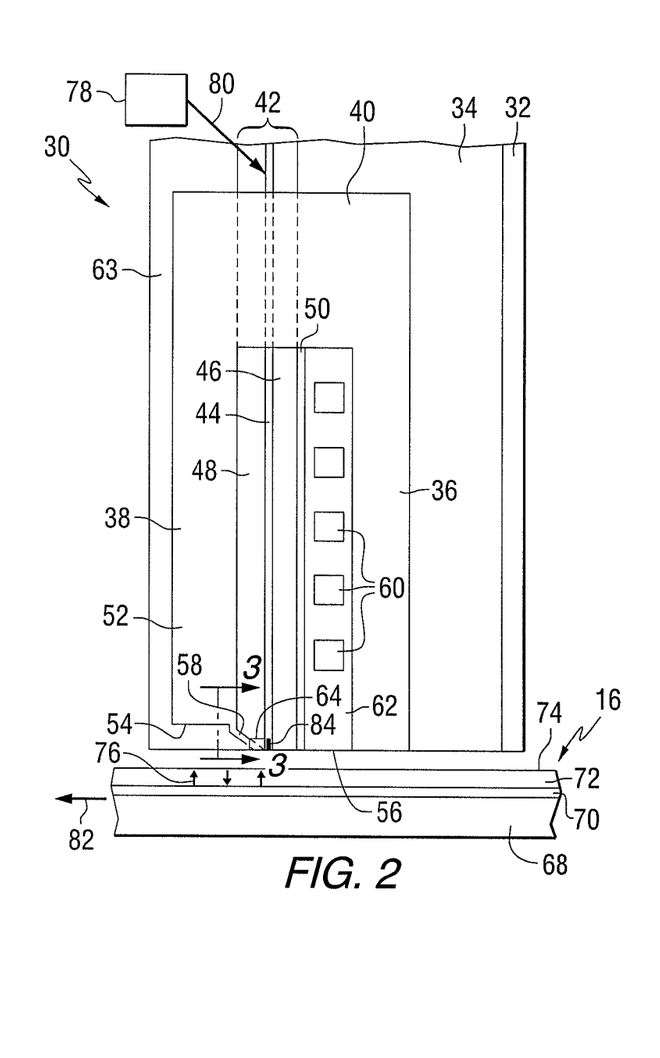
FIG. 2 is a side elevation view of a recording head constructed in accordance with an aspect of the invention.
Figure 3:
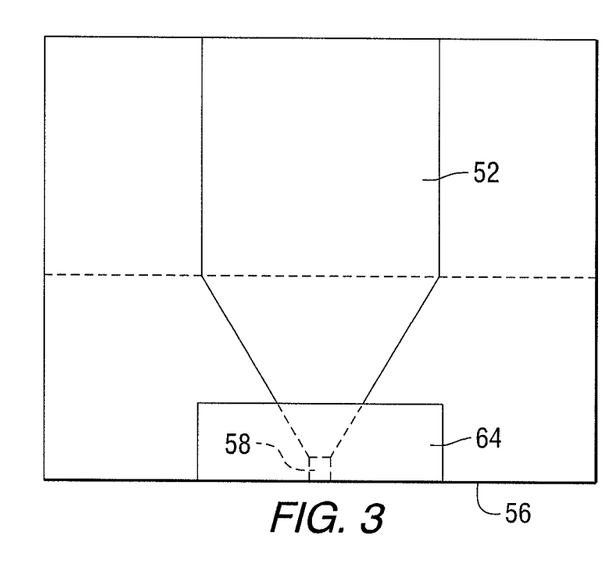
FIG. 3 is a cross-sectional view of another recording head of FIG. 2, taken along line 3-3.
Figure 4:
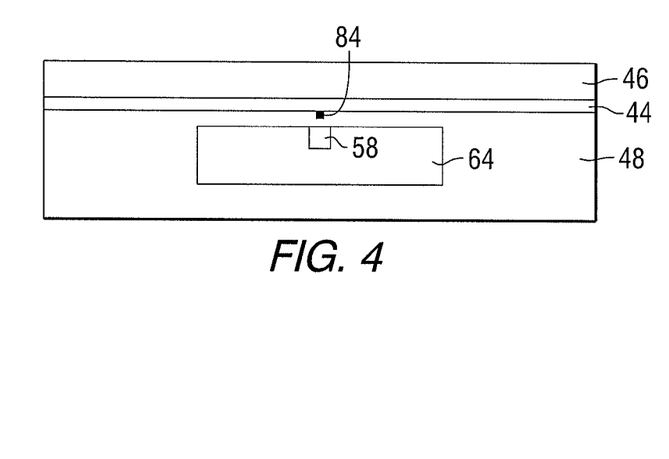
FIG. 4 is a plan view of the air bearing surface of the recording head of FIG. 2.

FIG. 2 is a side elevation view of a recording head constructed in accordance with an aspect of the invention, and positioned near a storage media. FIG. 3 is an enlarged cross-sectional view of a portion of the recording head of FIG. 2, taken along line 3-3. FIG. 4 is an enlarged plan view of a portion of the air bearing surface of the recording head of FIG. 2 in the vicinity of the write pole tip.

In FIGS. 2, 3 and 4, the recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. While this example includes a planar coil, other types of coils, such as a helical coil, could be used. A helical coil would wrap around the bottom/return pole. In alternative embodiments, the planar coil could be positioned between the waveguide and the top pole. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole.

In this example, the top pole 38 is comprised of a first pole piece 52 and a second pole piece 58. However, the top pole could be fabricated as a single pole piece or as a plurality of layers. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. For example, the light source 78 may work in combination with an optical fiber and external optics for collimating the light beam 80 from the optical fiber toward a diffraction grating on the waveguide. Alternatively, a laser may be mounted on the waveguide 42 and the light beam 86 may be directly coupled into the waveguide 42 without the need for external optical configurations. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82.

The heat sink could be shaped, for example, to remove the heat sink material from the ABS everywhere but in close proximity to the pole where it also acts as an aperture, to remove the material from over the gratings, or to remove it from any other part of the head where it may not be desirable. The heat sink could be patterned using a standard dry or wet etch or by using a lift-off technique.

The heat sink can also be shaped differently from that shown in FIGS. 2, 3 and 4. For example, the heat sink need not have a rectangular shape, and it may extend further away from the air bearing surface than shown in the example of FIGS. 2, 3 and 4. In other examples, the heat sink can partially or fully surround a portion of the write pole, and it may also extend along a surface of the write pole.

The heat sink efficiency can be increased by inserting a high thermal conductivity layer adjacent to the pole to help conduct the heat away from the heat sink. This heat sink extension can be adjacent to the pole and it can extend off to the sides of the pole or even wrap around the pole. The extension could extend all the way to the ABS.

The heat sink could be a single film or it could be a multi-layer or alloy to optimize the heatsinking and aperturing properties and possibly other properties such as corrosion and smearing during lapping. In an example recording head, a near-field transducer (NFT) 84 is positioned in or adjacent to the waveguide near the air bearing surface. The heat sink material may be chosen such that it does not interfere with the resonance of the NFT. For example, Au may function as an aperture, but it may interfere with the NFT by forming its own surface plasmons (SPs). A layer of material could be deposited before the Au, for example Cr, or the Au could be alloyed to prevent it from forming surface plasmons.

Although the example of FIGS. 2, 3 and 4 shows a perpendicular magnetic recording head and a perpendicular magnetic storage media, it will be appreciated that the invention may also be used in conjunction with other types of recording heads and/or storage media where it may be desirable to employ heat assisted recording.

Figure 5:
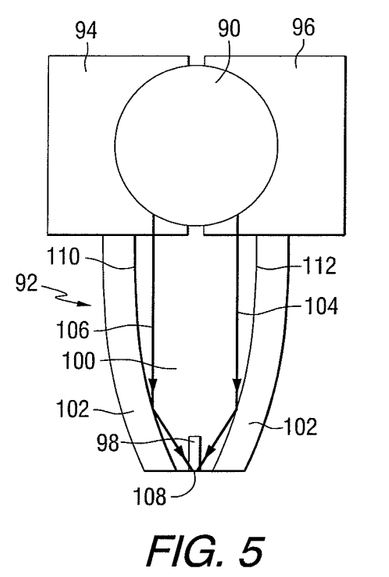
FIG. 5 is a schematic representation of a waveguide that can be used in another recording head constructed in accordance with an aspect of the invention.

FIG. 5 is a schematic representation of the back of a slider showing a waveguide that could be used in place of the waveguide 42 in FIG. 2. FIG. 5 shows a laser light spot 90 that is directed onto a solid immersion mirror (SIM) 92, with gratings 94, 96 for coupling the light into the SIM, and a write pole 98. The waveguide core 100 is positioned in a layer 102 of a material having an index of refraction that is larger than the index of refraction of the core material, such that light represented by arrows 104 and 106 is reflected toward a focal point 108. The edges 110, 112 of the core layer can have a parabolic shape. A spot of light, represented by circle 90, impinges on gratings 94 and 96 to couple the light into the waveguide.

Figure 6:
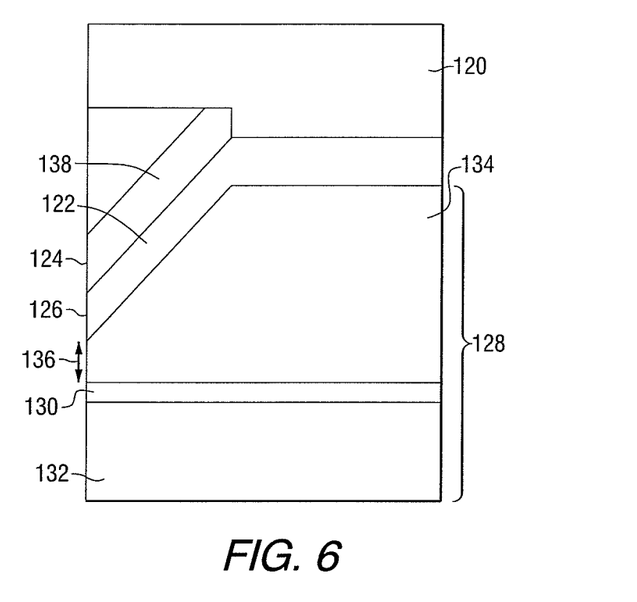
FIG. 6 is a cross-sectional view of a portion of a recording head constructed in accordance with another aspect of the invention.
Figures 7, 8:
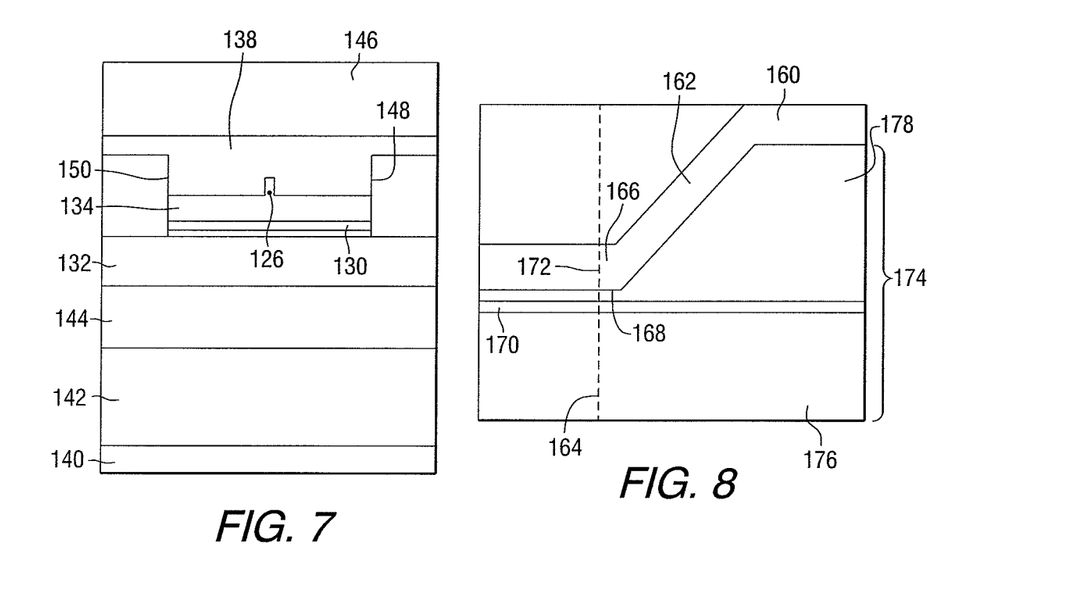
FIG. 7 is a plan view of the air bearing surface of the recording head of FIG. 6.
FIG. 8 is a cross-sectional view of a portion of a recording head constructed in accordance with another aspect of the invention.

FIG. 6 is an enlarged cross-sectional view of a portion of another recording head constructed in accordance with another aspect of the invention. In the example of FIG. 6, a write pole 120 includes a sloped portion 122 that extends toward an air bearing surface 124 and has an end 126 positioned adjacent to the air bearing surface. A waveguide 128 includes a core layer 130 and cladding layers 132 and 134. The write pole is configured such that the end of the write pole is separated from the core layer by a distance 136, referred to as the core-to-pole spacing. A heat sink 138 is positioned adjacent to the write pole. FIG. 7 is a plan view of a portion of an air bearing surface of a recording head that includes the structure of FIG. 6 and further shows a substrate 140, a basecoat 142, a return pole 144, a top coat 146, and sides 148, 150 of the waveguide.

In another aspect, the invention provides a recording head that includes a write pole having a throat that is separated from a waveguide core by the core-to-pole spacing. FIG. 8 is a cross-sectional view of a portion of an intermediate structure used in the fabrication of another recording head constructed in accordance with this aspect of the invention. This intermediate structure will be lapped to the dotted line at the location of an air bearing surface of the recording head. In the example of FIG. 8, a write pole 160 includes a sloped portion 162 that extends toward an air bearing surface 164 and a throat portion 166 that has a side 168 which is spaced from a waveguide core layer 170 and positioned on a plane substantially parallel to the core layer. The throat portion has an end 172 positioned adjacent to the air bearing surface. A waveguide 174 includes the core layer 170 and cladding layers 176 and 178.

Modeling has shown that 2.6% of the light is absorbed by a 30° sloped pole. In addition, if a NFT is incorporated into the design, modeling predicts that a ~20% reduction is seen with the sloped pole. When aligning the magnetic field gradient from the pole and the thermal gradient created by the waveguide, it is desirable to control the spacing at the ABS between the waveguide core and the sloped pole. In one example, a spacing of about 15 nm is of interest since this spacing is needed to get the magnetic and thermal gradients to add.

One approach for fabricating the head of FIG. 8 uses an etch stop to control the spacing. In one example, the layer of the waveguide core could be made of a material that does not etch at an appreciable rate with the etch technique that is used to form the slope in the top cladding. Some alternative core materials may be $LiNbO_3$, $LiTaO_3$, $ZrO_2$, HfO, $TiO_2$ or diamond like carbon. After the sloped wall etch, a thin layer of cladding would be deposited on the core layer to set the core-to-pole spacing.

Figure 9:
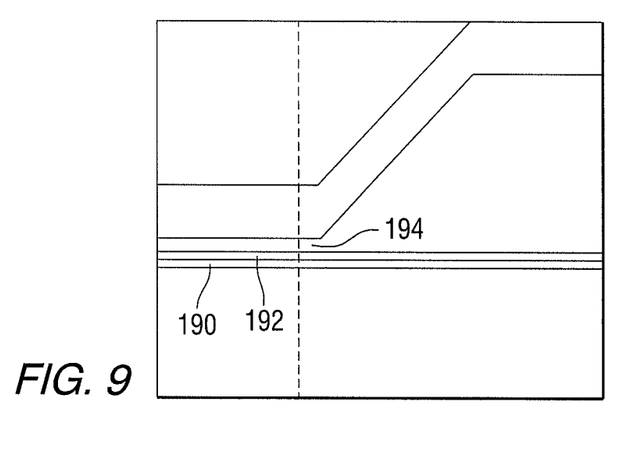
FIG. 9 is a cross-sectional view of a portion of another recording head constructed in accordance with an aspect of the invention.

In another example, the core could be made of two materials 190, 192 where the top layer acts as an etch stop, such as $Ta_2O_5\backslash LiNbO_3$, as shown in FIG. 9. If both materials have a large index of refraction (n), the light will be spread across the two materials. This could be used to combine the best properties of the two materials, such as an etch stop capability and a higher refractive index n, or an etch stop and better propagation losses. After the sloped wall etch, a thin layer of cladding 194 would be deposited on the core to set the core-to-pole spacing.

Figure 10:
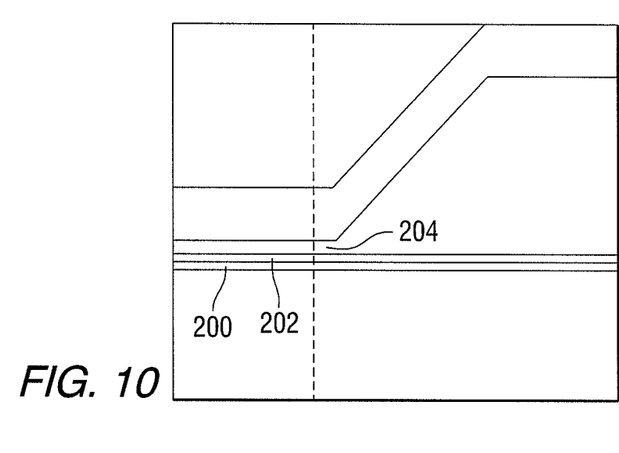
FIG. 10 is a cross-sectional view of another recording head constructed in accordance with an aspect of the invention.

In another example, a thin layer of a different cladding material 200 could be deposited on top of the core layer 202, where this cladding material acts as an etch stop, as shown in FIG. 10. This approach would be used if the etch stop material has a n less than the core layer so that it could not be used as a waveguide core material. After the sloped wall etch, a thin layer of cladding 204 would be deposited on the core to set the core-to-pole spacing.

In another example, the top cladding could be made of a different material and the etch technique could be changed. For example, the top cladding could be made of a material that etches in an oxygen etch, such as an organic polymer, spin-on-glass, or diamond like carbon. After the sloped wall etch, a thin layer of cladding would be deposited to set the core-to-pole spacing.

The examples of FIGS. 9 and 10 use optically transparent etch stops, so they could be deposited over the entire waveguide, or they could be deposited only where the etch stop is needed (i.e., near the future ABS location).

Figure 11:
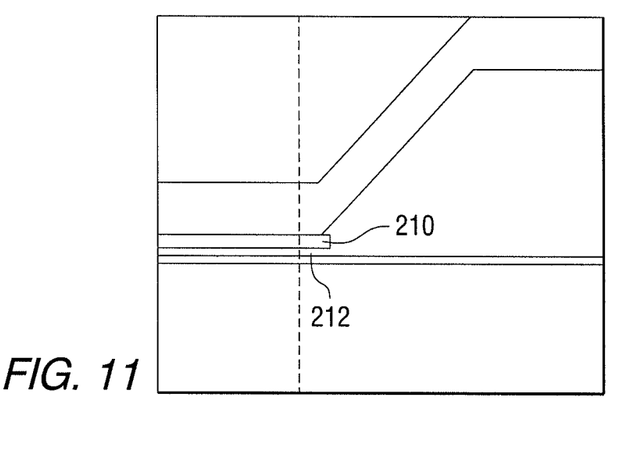
FIG. 11 is a cross-sectional view of another recording head constructed in accordance with an aspect of the invention.

In other examples, a non-transparent etch stop can be used. FIG. 11 shows an example, wherein a magnetic etch stop 210 is placed only near the ABS location, and the core-to-pole spacing would be set by the deposition of a spacer 212 before depositing the magnetic etch stop. The magnetic etch stop could be deposited, and then etched, lifted off or plated. The etch stop will become part of the pole. In addition, the etch stop could extend beyond the intended breakpoint of the pole by an amount needed to compensate for the different tolerances.

The non-transparent etch stop may alternatively be non-magnetic and removed before the pole is deposited. In this case, the etch stop would be etched away before the pole is formed. This could be done by changing the etch technique. For example, a wet etch could be used, which could be very selective to the etch stop over the waveguide. There may be a very small void formed where the etch stop extends behind the pole breakpoint, or there may be some etch stop remaining here. This will depend on the processes that are used for etching away the etch stop and if it is backfilled with top cladding before the pole is deposited.

The non-transparent material could be a metal, dielectric, resist, or other organic or polymer materials. The metals can be selectively etched away. The same is true for the organic materials where a solvent can be used.

In another aspect, the invention relates to HAMR heads that include a near-field transducer to further concentrate the light in the vicinity of the focal point of the waveguide. One possible near-field transducer (NFT) for the HAMR head is the lollipop design shown in FIG. 12. The near-field transducer 230 includes a disk portion 232 and a peg 234 extending between the disk and an air bearing surface 236. This NFT can be placed near the focal point of a solid immersion mirror (SIM) and in close proximity to the magnetic write pole as shown in FIG. 13.

The NFT is relatively thermally isolated and it absorbs a significant portion of the laser power while it is in resonance. The temperature of the NFT will increase as energy from the light is absorbed by the NFT. This could result in melting of the NFT, or thermal expansion could cause the NFT to protrude from the head, or layer of the head could delaminate. Thus, it is desirable to have a means to keep the NFT cooler.

One solution for keeping the NFT cool is to heat sink the NFT transducer to the write pole. This solution connects the NFT to the pole via a heat sink. FIG. 13 shows a recording head, wherein a heat sink 238 extends between the write pole 240 and the NFT. An additional optional heat sink 242 can be provided adjacent to the write pole. The heat sink material should be a good thermal conductor, such as for example, Au, Cu, Al or Ag.

Figure 12:
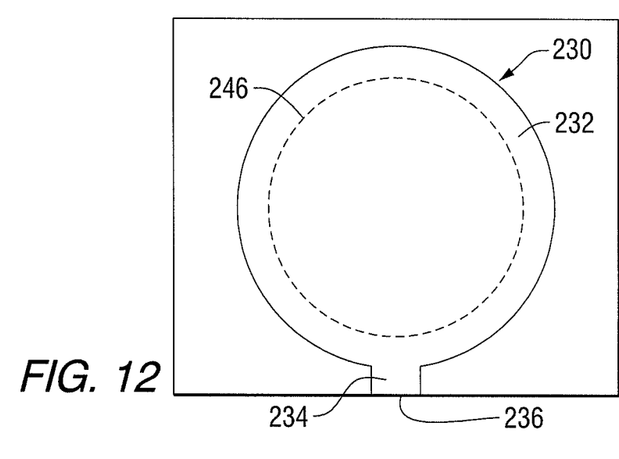
FIG. 12 is a side view of a near-field transducer.
Figure 13:
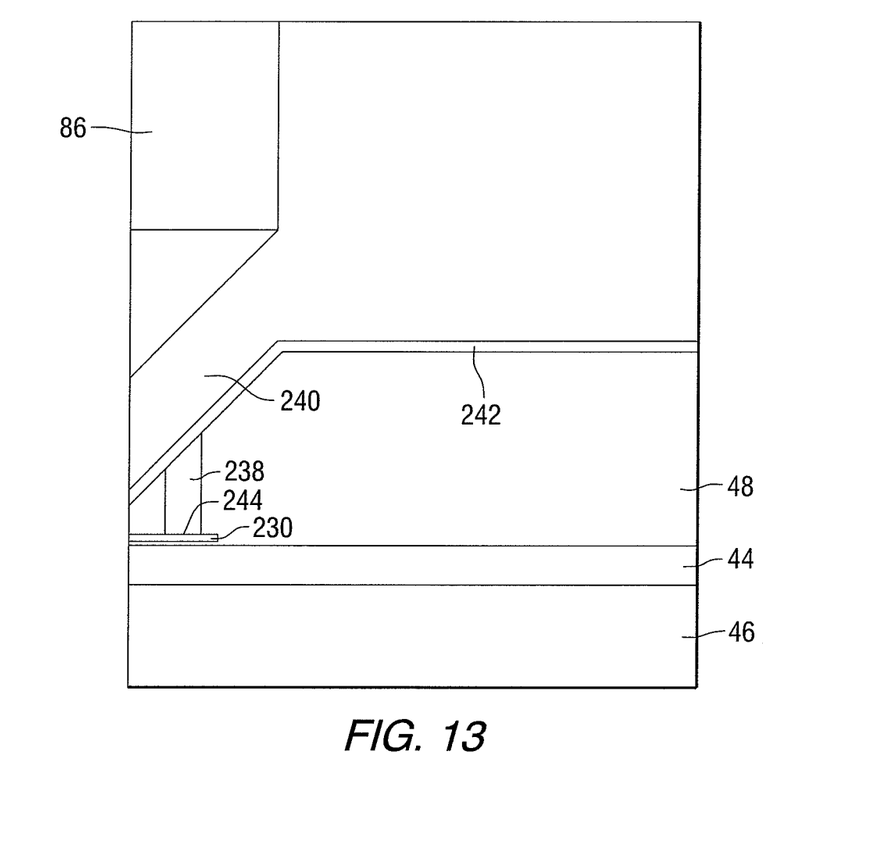
FIG. 13 is an enlarged cross-sectional view of a portion of another recording head constructed in accordance with an aspect of the invention.

FIG. 13 is an enlarged cross-sectional view of a portion of a recording head similar to that of FIGS. 2, 3 and 4, but with a near-field transducer 230 positioned near the focal point of the waveguide. In this example, the near-field transducer is positioned in the cladding layer 48. A heat sink 238 is positioned adjacent to the near-field transducer. In this example, an end 244 of the heat sink makes contact with the disc of the NFT. Dotted circle 246 in FIG. 12 shows the area of contact between the heat sink and the disk of the NFT. In one example, the heat sink makes contact with the disk in a region that is spaced from an edge of the disk by at least 50 nm.

In one example of a lollipop NFT, the disk has a diameter of 300 nm and the peg has a length of 12.5 nm. If it is assumed that the heat sink cannot come within 50 nm of the edge of the disc and the mean +3σ for the alignment and diameter dimension is 25 nm each, a 100 nm diameter heat sink should be possible.

Heat sinking could also be achieved by inserting a good thermal conductor that is also a dielectric between the NFT and the pole, such as diamond like carbon (DLC) or AlN. This may allow for the heat sink to be the same shape as the NFT and still allow for the NFT to resonate. DLC can have a very high thermal conductivity, so it would make a good heat sink.

Figure 14:
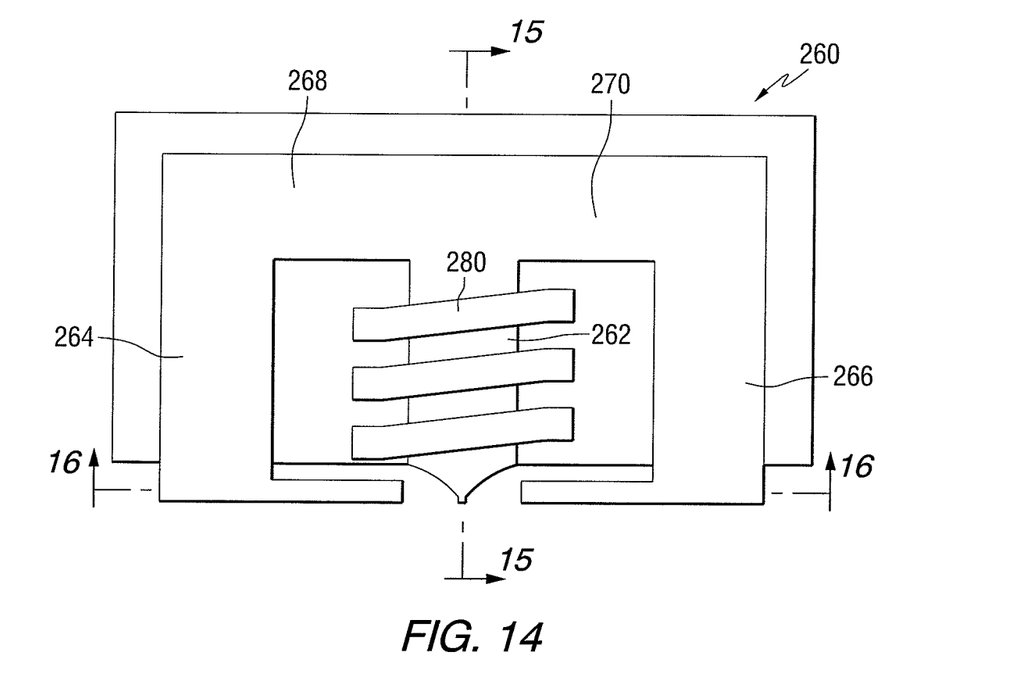
FIG. 14 is an end elevation view of a recording head constructed in accordance with another aspect of the invention.
Figure 15:
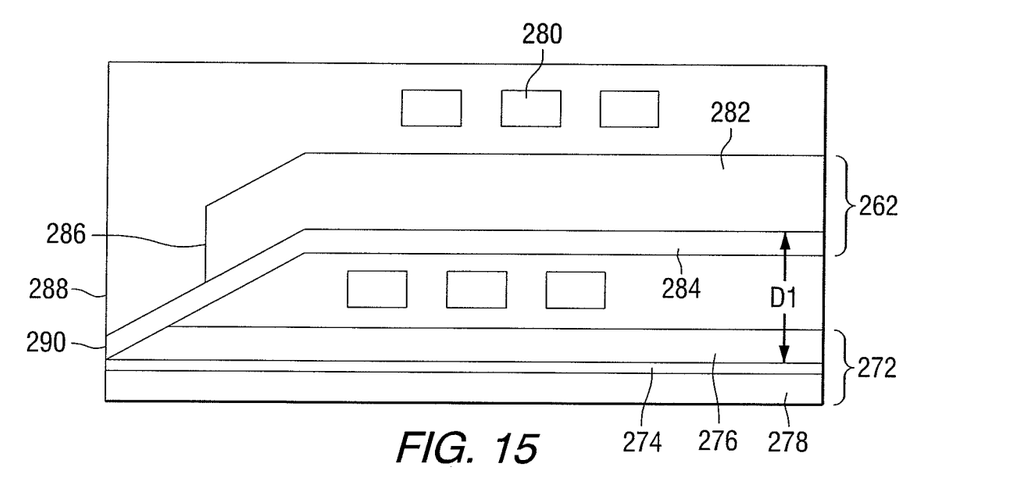
FIG. 15 is a cross-sectional view of a portion of the recording head of FIG. 14, taken along line 15-15.
Figure 16:
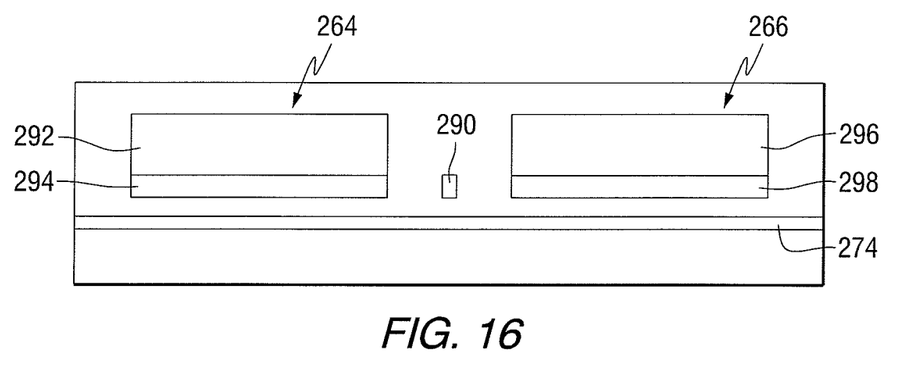
FIG. 16 is a cross-sectional view of a portion of the recording head of FIG. 14, taken along line 16-16.

In another aspect, this invention provides a recording head for use in heat assisted magnetic recording in which the write pole and return pole(s) are arranged such that the poles do not adversely impact light transmitted through a waveguide in the head. The magnetic portions of the head can be fabricated separately and after the optical portions are fabricated. The magnetic portions need not intersect the waveguide and thus do not block the light in the waveguide. In addition, the head can be fabricated using simpler processing, such as limiting the number of magnetic pole layers. FIG. 14 is a side elevation view of a recording head 260 constructed in accordance with this aspect of the invention. FIG. 15 is a cross-sectional view of the head of FIG. 14, taken along line 15-15. FIG. 16 is a cross-sectional view of the head of FIG. 14, taken along line 16-16.

Recording head 260 includes a first pole, in the form of a write pole 262 and second and third poles in the form of return poles 264 and 266. Return poles 264 and 266 are magnetically coupled to the write pole through yokes 268 and 270, respectively. The poles and yokes are positioned opposite a first side of an optical condenser 272 that includes a waveguide. The waveguide includes a core layer 274 and cladding layers 276 and 278 on opposite sides of the core layer.

A spiral coil 280 is positioned around the write pole. Current flowing in the coil causes a magnetic field in the write pole that can be used to write data to an adjacent storage medium (not shown). The write pole 262 includes a first layer 282 that is spaced from the waveguide core layer by a distance D1, and a second layer 284 that extends from an end 286 of the first layer in a direction toward an air bearing surface 288, and is configured such that an end 290 of the second layer is closer to the waveguide than the first layer of the write pole.

Layer 284 can be a different shape than layer 282 and, depending on the desired field profile, it may not extend all the way to the ends of the return poles. As shown in FIG. 16, the return poles 264 and 266 can include two layers 292, 294 and 296, 298. Layer 282 is optional and its thickness and material properties could be optimized. Layer 284 could be a solid material or it could have the graded $M_s$, where the $M_s$ decreases from the bottom to the top of the pole.

Figure 17:
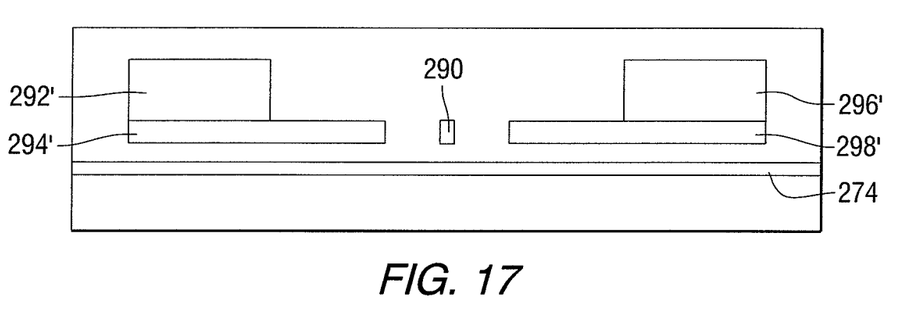
FIG. 17 is a cross-sectional view of a portion of another recording head.
Figure 18:
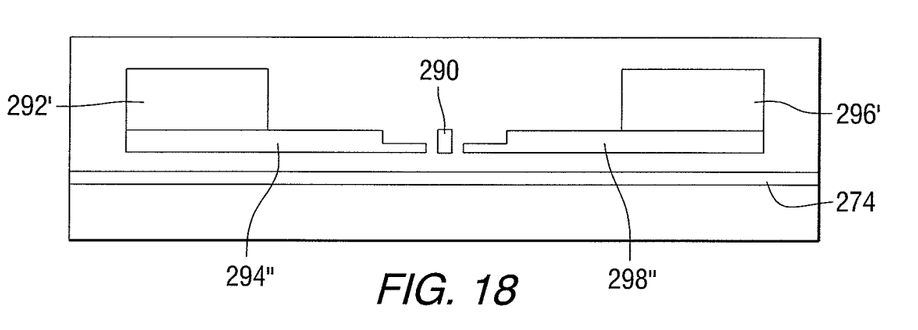
FIG. 18 is a cross-sectional view of a portion of another recording head.

Depending on the acceptable complexity of the processing and the need for performance, many variations of the return pole shape, thickness and material properties could be used. For example, thin extensions 294' and 298' could be formed on the return poles 292' and 296' as illustrated in FIG. 17, or stepped thin extensions 294" and 298" could be formed on the return poles 292' and 296' as illustrated in FIG. 18. FIGS. 17 and 18 are cross-sectional views of other heads taken near the air bearing surface at a location similar to that of FIG. 16. The return pole extensions can be formed by either adding another plating step or by masking the seedlayer during the seed etch.

Figure 19:
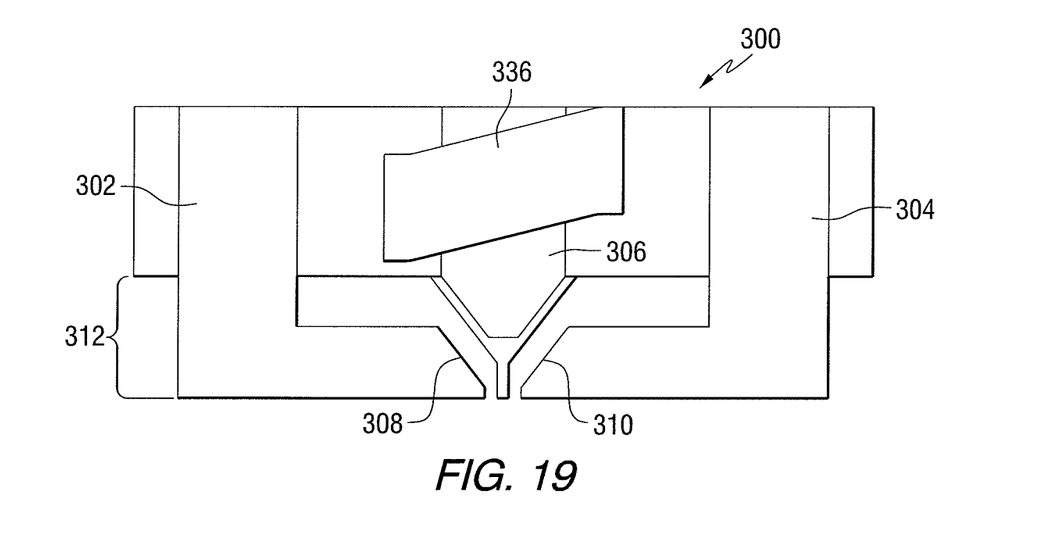
FIG. 19 is an end elevation view of another recording head constructed in accordance with another aspect of the invention.

FIG. 19 is a cross-sectional view of a variation of the head of FIG. 14, with shorter pole widths. FIG. 19 shows a recording head 300 having return poles 302, 304, which may be shaped near the main pole 306 to shape the field profile. The return poles include tapered ends 308 and 310. The end region 312 of the pole would be sloped toward the core layer of an optical transducer, in a manner similar to that shown in FIG. 15.

Figure 20:
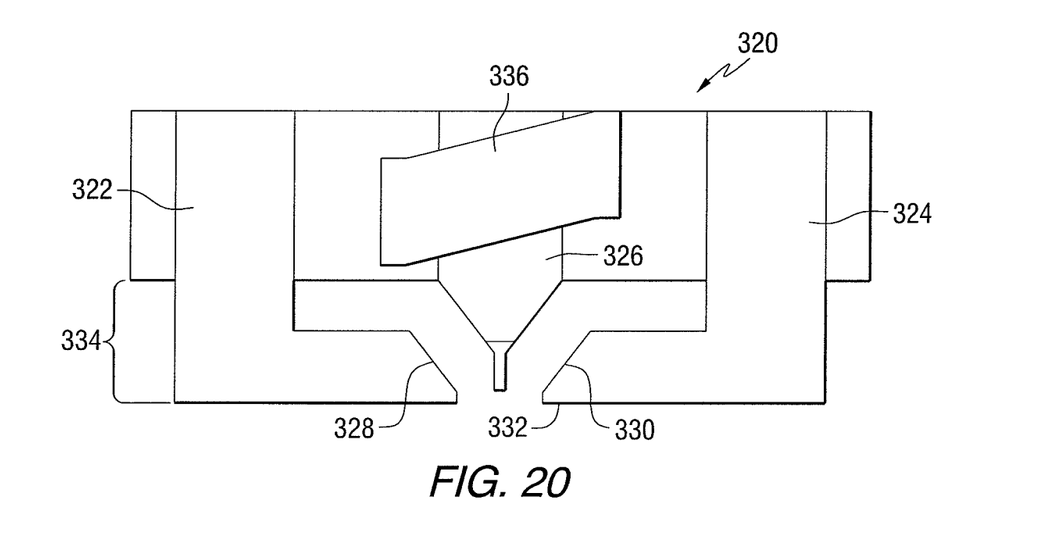
FIG. 20 is an end elevation view of another recording head constructed in accordance with another aspect of the invention.

FIG. 20 shows a similar design with the main pole recessed. The recording head 320 of FIG. 19 includes return poles 322, 324 that are shaped near the main pole 326 to shape the field profile. The return poles include tapered ends 328 and 330. The main pole is recessed from the air bearing surface 332. The recessed main pole allows for a more uniform field in the media where the thermal spot is located. Recessing the pole will improve the optical efficiency and will relax some of the processing constraints, such as the placement of the sloped wall with respect to the near-field transducer or reader. The end region 334 of the pole would be sloped toward the core layer of an optical transducer, in a manner similar to that shown in FIG. 15.

In FIGS. 19 and 20, the coil 336 is a helical coil. The coil could wrap around the center leg, but there could also be coil turns around the top or side legs, without adding processing.

The heads of FIGS. 14-20 illustrate examples of a single layer HAMR writer with horizontal return poles. This design has no flux return path cutting down through the waveguide, which makes processing easier and could also make the head more optically efficient.

The waveguide materials can all be deposited before the writer is built. Thus, if the reader were to be built after the writer, high temperature processes could be used for the waveguide materials, if desired.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:
1. An apparatus comprising:
   first and second poles magnetically coupled to each other and positioned on opposite sides of a waveguide; and
   a near-field transducer (NFT) adjacent to the waveguide and a heat sink positioned adjacent the NFT and capable of cooling the NFT.

2. The apparatus of claim 1, wherein the near-field transducer comprises a disk and a peg positioned between the disk and an air bearing surface, and the heat sink makes contact with the disk.

3. The apparatus of claim 2, wherein a region of contact between the heat sink and the disk is spaced from an edge of the disk.

4. The apparatus of claim 1, wherein the first pole includes a first portion spaced from the waveguide and a second portion extending from the first portion toward the air bearing surface, with the second portion being structured such that an end of the second portion is closer to the core layer of the waveguide than the first portion.

5. The apparatus of claim 1, wherein the heat sink comprises a thermally conductive dielectric material.

6. An apparatus comprising:
   first and second poles magnetically coupled to each other and positioned on opposite sides of a waveguide;
   a near-field transducer positioned adjacent to the waveguide; and
   a heat sink positioned adjacent the near-field transducer and capable of cooling the near-field transducer.

7. The Apparatus of claim 6, wherein the first pole includes a first portion spaced from the waveguide and a second portion extending from the first portion toward the air bearing surface, with the second portion being structured such that an end of the second portion is closer to the core layer of the waveguide than the first portion and wherein the heat sink is positioned between the near-field transducer and the second portion of the first pole.

8. The apparatus of claim 6, wherein the near-field transducer comprises a disk and a peg positioned between the disk and an air bearing surface.

9. The apparatus of claim 8, wherein the heat sink makes contact with the disk.

10. The apparatus of claim 6, wherein the heat sink is thermally connected with the first pole.

11. The apparatus of claim 6 wherein the heat sink comprises diamond like carbon (DLC material).

12. The apparatus of claim 6, wherein the heat sink comprises a thermally conductive dielectric material.

13. An apparatus comprising:
   a waveguide having a core layer and an end adjacent to an air bearing surface;
   a near-field transducer positioned adjacent to a focal point of the waveguide;
   a heat sink positioned adjacent the near-field transducer, wherein the heat sink is capable of cooling the near-field transducer; and
   first and second poles magnetically coupled to each other and positioned on opposite sides of the waveguide.

14. The apparatus of claim 13, wherein the first pole includes a first portion spaced from the waveguide and a second portion extending from the first portion toward the air bearing surface.

15. The apparatus of claim 14, wherein the second portion being structured such that an end of the second portion is closer to the core layer of the waveguide than the first portion.

16. The apparatus of claim 14, wherein the heat sink is positioned between the near-field transducer and the second portion of the first pole.

17. The apparatus of claim 13, wherein the heat sink is made of at least one of Au, Cu, Al, and Ag.

18. The apparatus of claim 13, wherein the wherein the near-field transducer comprises a disk and a peg positioned between the disk and the air bearing surface.

19. The apparatus of claim 18, wherein the heat sink is parallel to the air bearing surface.

20. The apparatus of claim 13, wherein the heat sink comprises a thermally conductive dielectric material.

\* \* \* \* \*